US011203456B2

(12) United States Patent
 Bonardi (10) Patent No.: US 11,203,456 B2
(45) Date of Patent: Dec. 21, 2021

(54) LABELING MACHINE

(71) Applicant: P.E. LABELLERS S.P.A., Porto Mantovano (IT)

(72) Inventor: Luca Bonardi, San Giorgio di Mantova (IT)

(73) Assignee: P.E. LABELLERS S.P.A., Porto Mantovano (IT)

(*) Notice: Subject to any disclaimer, the term of this patent is extended or adjusted under 35 U.S.C. 154(b) by 0 days.

(21) Appl. No.: 17/056,075

(22) PCT Filed: May 22, 2019

(86) PCT No.: PCT/EP2019/063239
§ 371 (c)(1),
(2) Date: Nov. 17, 2020

(87) PCT Pub. No.: WO2019/228890
PCT Pub. Date: Dec. 5, 2019

(65) Prior Publication Data
US 2021/0206528 A1  Jul. 8, 2021

(30) Foreign Application Priority Data

May 30, 2018  (IT) .................. 102018000005843

(51) Int. Cl.
*B65C 9/40* (2006.01)
*B65C 9/02* (2006.01)
*F16P 1/00* (2006.01)

(52) U.S. Cl.
CPC .................. *B65C 9/40* (2013.01); *B65C 9/02* (2013.01); *F16P 1/00* (2013.01)

(58) Field of Classification Search
CPC ..................................... B65C 9/40; F16P 1/00
See application file for complete search history.

(56) References Cited

U.S. PATENT DOCUMENTS

2014/0306391 A1  10/2014  Eichhammer
2018/0354670 A1* 12/2018  Schinelli ................... B65C 9/40

OTHER PUBLICATIONS

Ministry of Economic Development, Search Report and Opinion, Italian Patent Application No. 2018000005843, 7 pages (dated Mar. 6, 2019).

(Continued)

*Primary Examiner* — Carson Gross
(74) *Attorney, Agent, or Firm* — Thompson Hine LLP (57) ABSTRACT

A labeling machine includes a base structure which rotatably supports a conveyance carousel for the containers to be labeled and at least one protection structure which can move, with respect to the base structure, from an active condition, in which it prevents access from the outside to at least one portion of the conveyance carousel, to an inactive condition, in which it allows access from the outside to the at least one portion of the conveyance carousel, and vice versa; the protection structure includes a supporting framework for components of the protection structure, which includes a profiled bar having an arc-like extension around the axis of the conveyance carousel, which is arranged above the base structure and forms at least one engagement seat for elements for fixing to the supporting framework at least one of the components.

4 Claims, 11 Drawing Sheets

(56) References Cited

OTHER PUBLICATIONS

European Patent Office, International Search Report, International Application No. PCT/EP2019/063239, 3 pages (dated Aug. 16, 2019).

European Patent Office, Written Opinion of the International Searching Authority, International Application No. PCT/EP2019/063239, 6 pages (dated Aug. 16, 2019).

* cited by examiner

LABELING MACHINE

The present invention relates to a labeling machine. Machines for labeling containers, such as bottles or the like, are known which have a base structure, on which a carousel is rotatably mounted which conveys the containers to be labeled.

Moreover, one or more labeling assemblies are arranged around the carousel, in mutually angularly different positions, and are designed to apply a label to the containers conveyed by the carousel.

In some types of labeling machine, the labeling assemblies can be coupled detachably to the base structure so that they can be interchanged in order to adapt the machine to different working requirements.

Typically, in order to avoid access of the operators to the carousel, the known machines are provided, around at least one portion of the carousel, with protection structures that can be moved from an active or closed condition, in which they prevent access from the outside to the carousel, to an inactive or open condition, in which they instead allow access, allowing moreover the coupling of the labeling assemblies, and vice versa.

Currently, these protection structures are doors which are hinged to the base structure so that they can be opened with a rotary movement or can be constituted by various panels which can slide with respect to each other along a vertical direction, so that they can be moved to a lowered position or a raised position, depending on whether one wishes, respectively, to prevent or allow access to the carousel.

These known solutions, besides the drawback of not making the carousel completely accessible from outside, when the protective structures are in the open condition, and of requiring the movement between the open condition and the closed condition of individual protection structures, are constructively very complex.

The aim of the present invention is to provide a labeling machine that is capable of improving one or more of the above mentioned aspects of the background art.

Within this aim, an object of the invention is to provide a labeling machine that has a protection structure that is simple to manufacture.

Another object of the invention is to provide a labeling machine that has a protection structure that is very easy to use.

Another object of the invention is to provide a labeling machine that is capable of giving the greatest assurances of reliability and safety in use.

A further object of the present invention is to overcome the drawbacks of the background art in a manner that is alternative to any existing solutions.

Another object of the invention is to provide a labeling machine that is highly reliable and has a competitive cost.

This aim and these and other objects which will become better apparent hereinafter are achieved by a labeling machine according to claim 1, optionally provided with one or more of the characteristics of the dependent claims.

Further characteristics and advantages of the invention will become better apparent from the description of a preferred but not exclusive embodiment, of the labeling machine according to the invention, illustrated by way of non-limiting example in the accompanying drawings, wherein.

With reference to the figures, the labeling machine according to the invention, generally designated by the reference numeral 1, comprises a base structure 2 on which a conveyance carousel 3 for the containers to be labeled is mounted in a rotatable manner, said carousel being conveniently provided at its peripheral region with a plurality of supports 3a of the individual containers.

Conveniently, on the base structure 2 there are an input conveyor 4 that feeds the containers in input to the conveyor carousel 3 and an output conveyor 5 that picks up the containers in output from the conveyance carousel 3.

Figure 1:
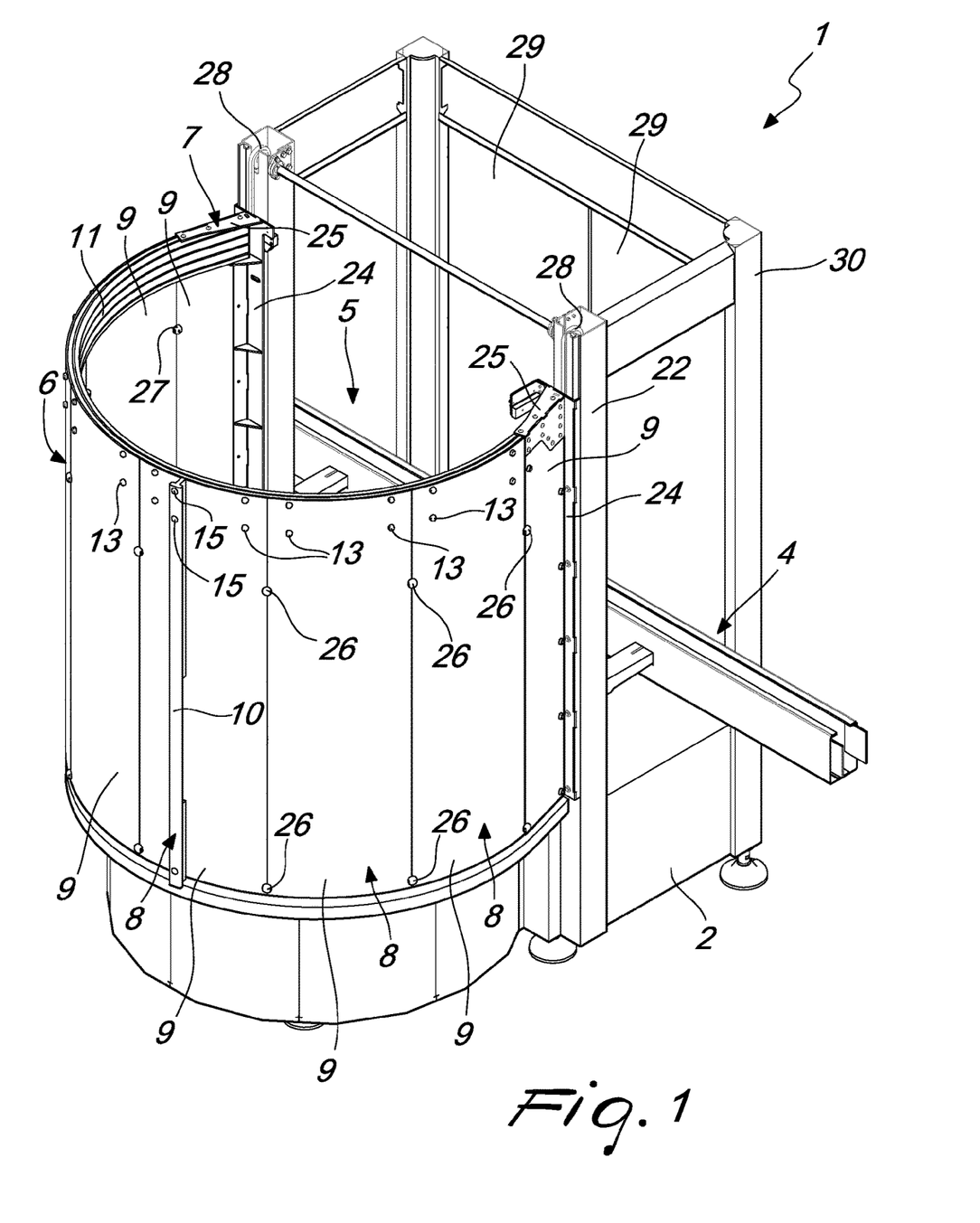
FIG. 1 is a perspective view of the machine according to the invention with a protection structure in the active condition.
Figure 2:
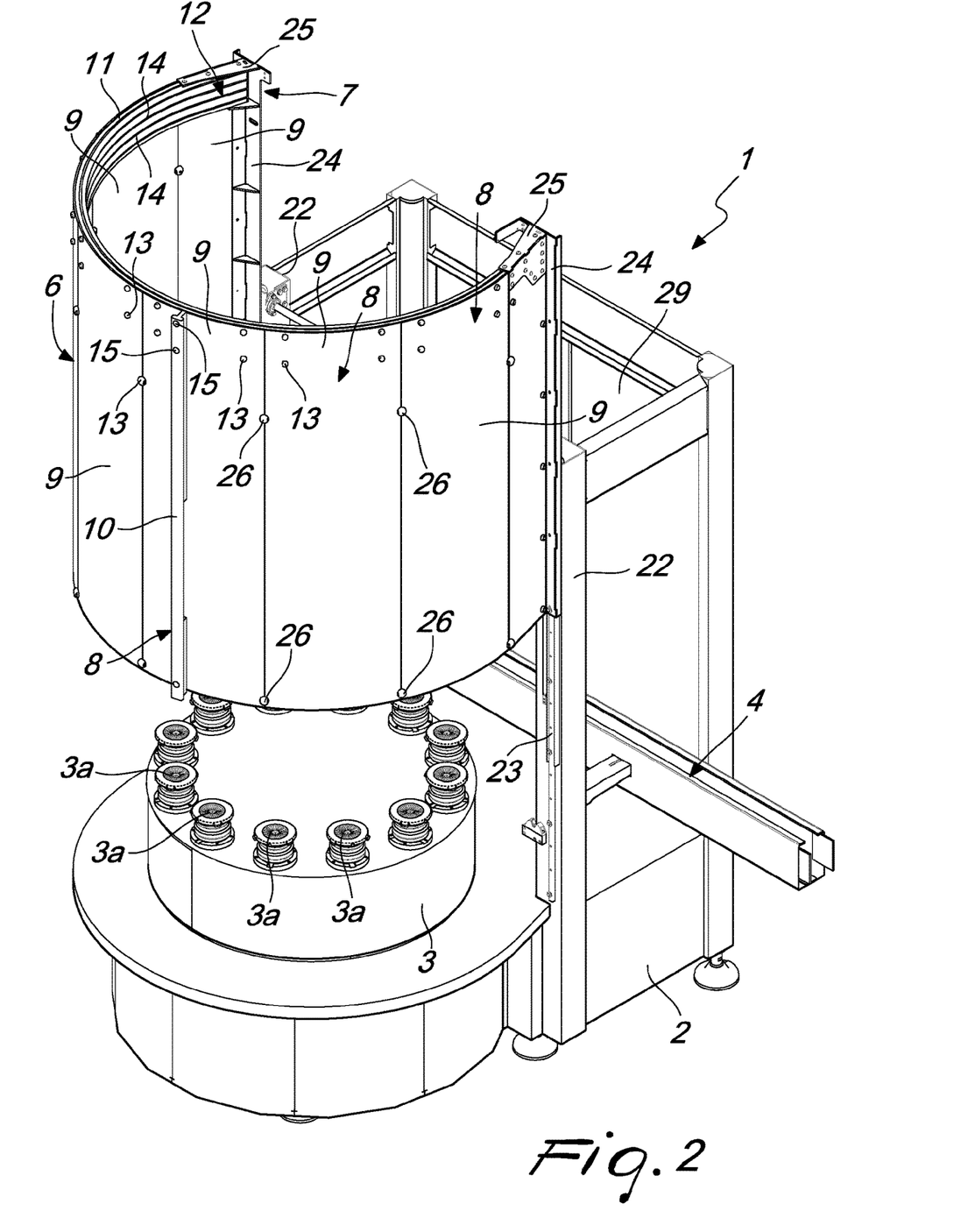
FIG. 2 is a perspective view of the machine according to the invention, with the protection structure in the inactive condition.
Figure 3:
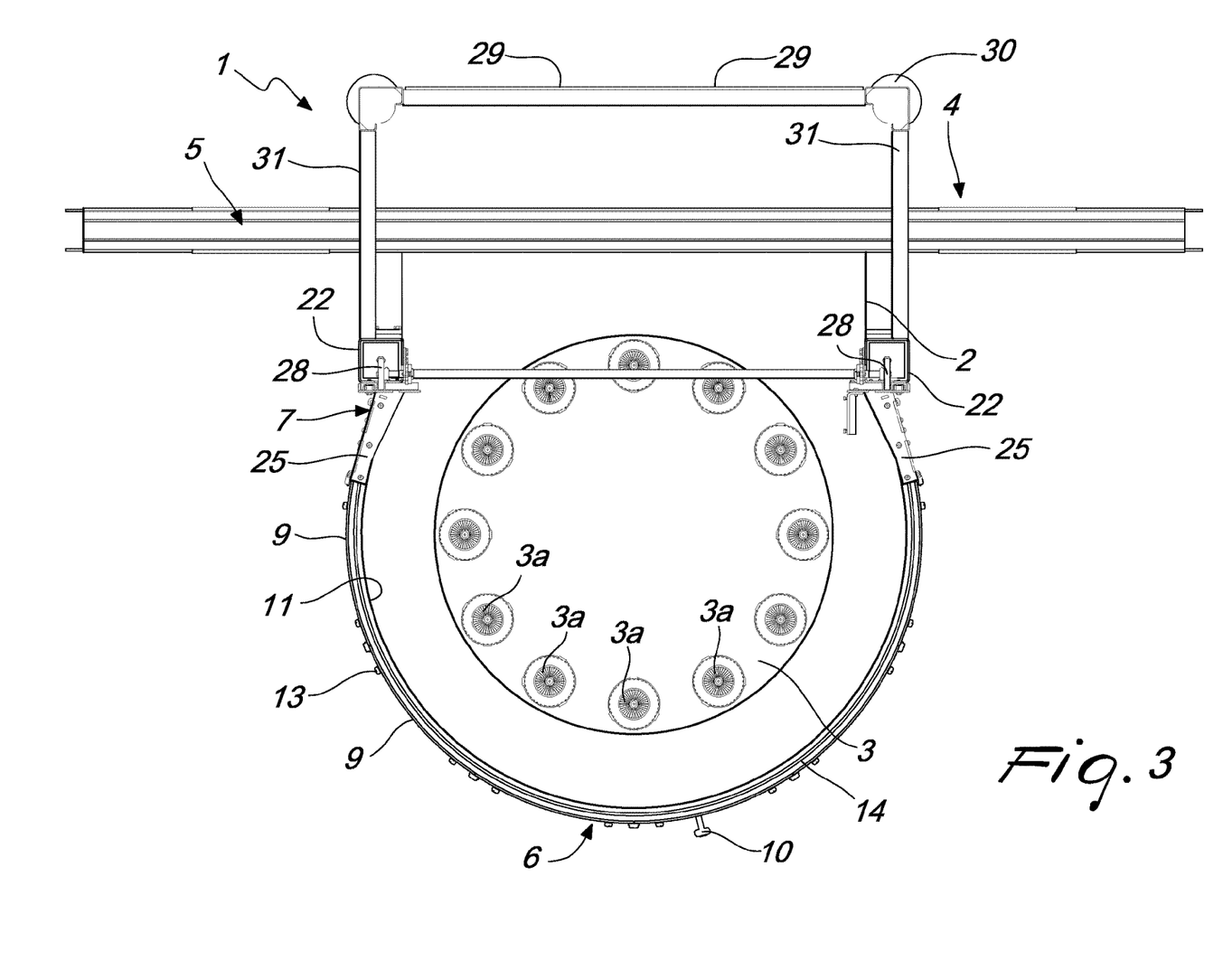
FIG. 3 is a top plan view of the machine according to the invention.
Figure 4:
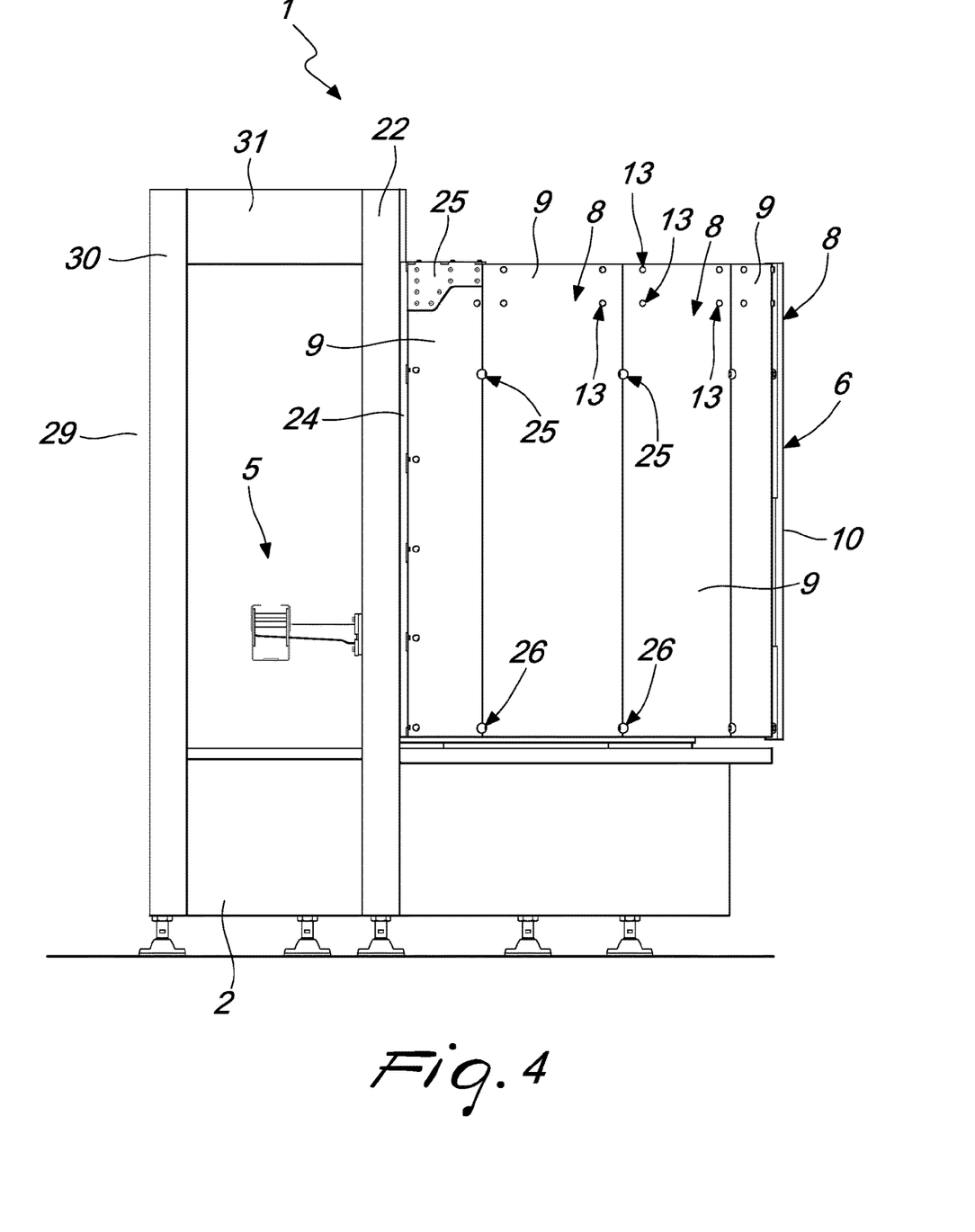
FIG. 4 is a lateral elevation view of the machine according to the invention with the protection structure in the active condition.
Figure 5:
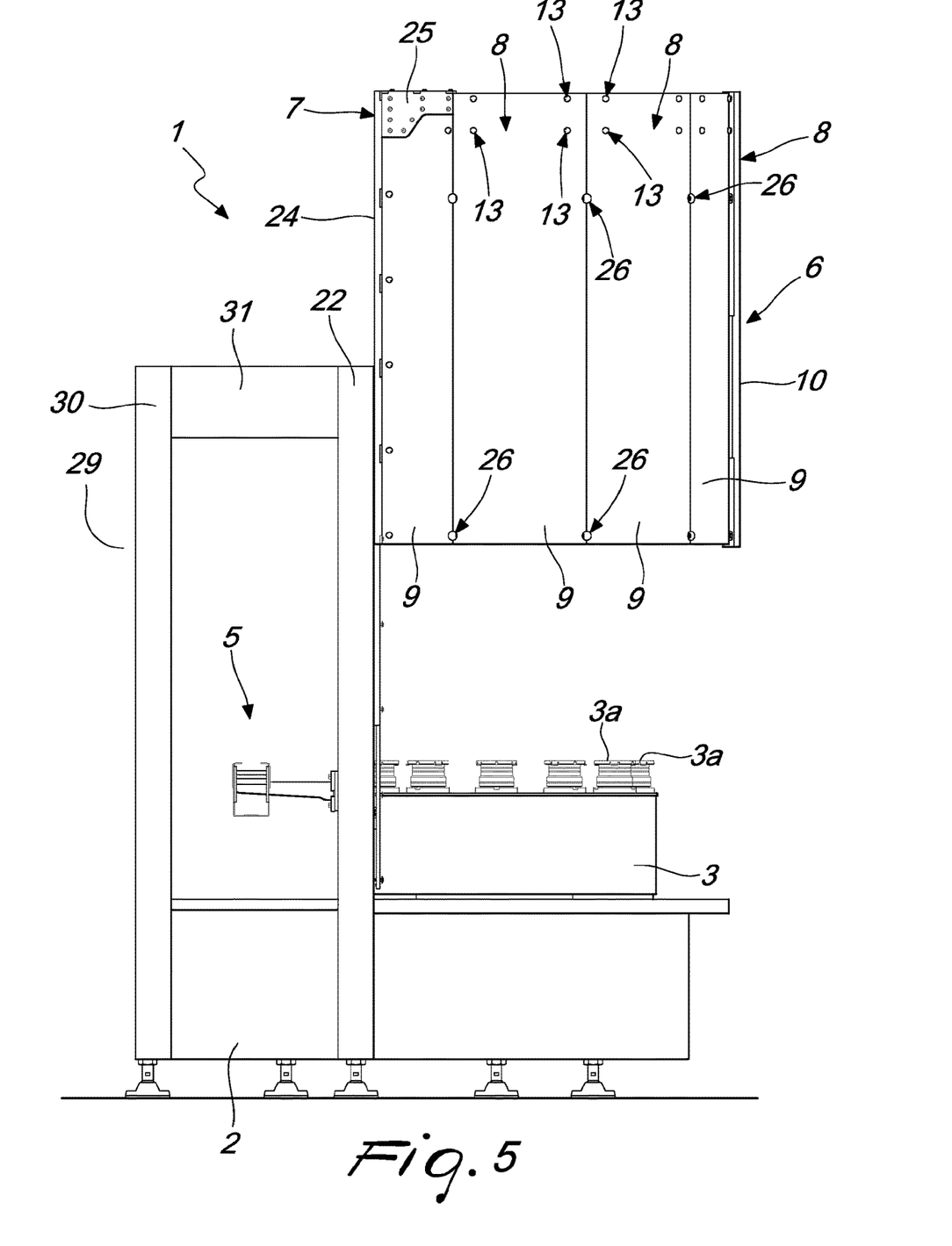
FIG. 5 is a lateral elevation view of the machine according to the invention with the protection structure in the inactive condition.
Figure 6:
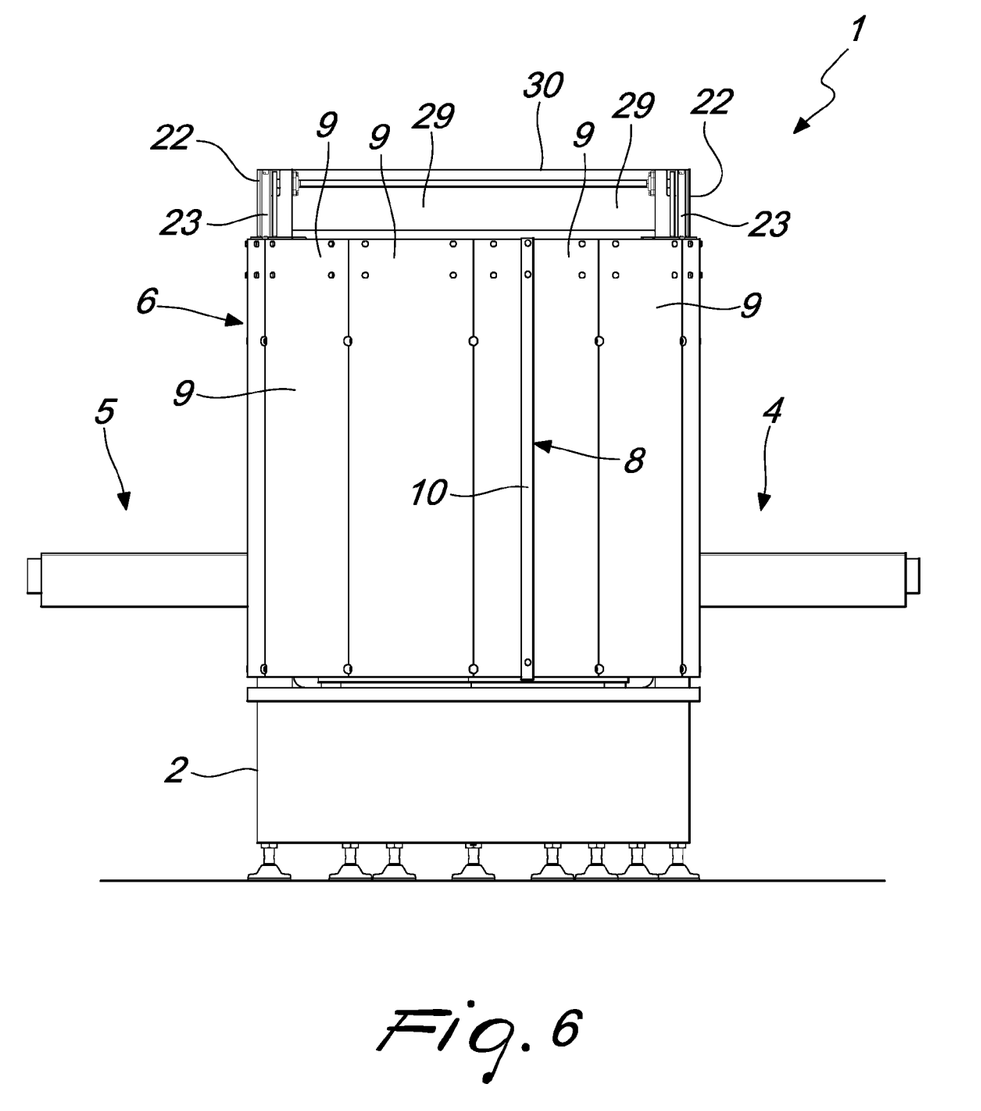
FIG. 6 is a front elevation view of the machine according to the invention with the protection structure in the active condition.
Figure 7:
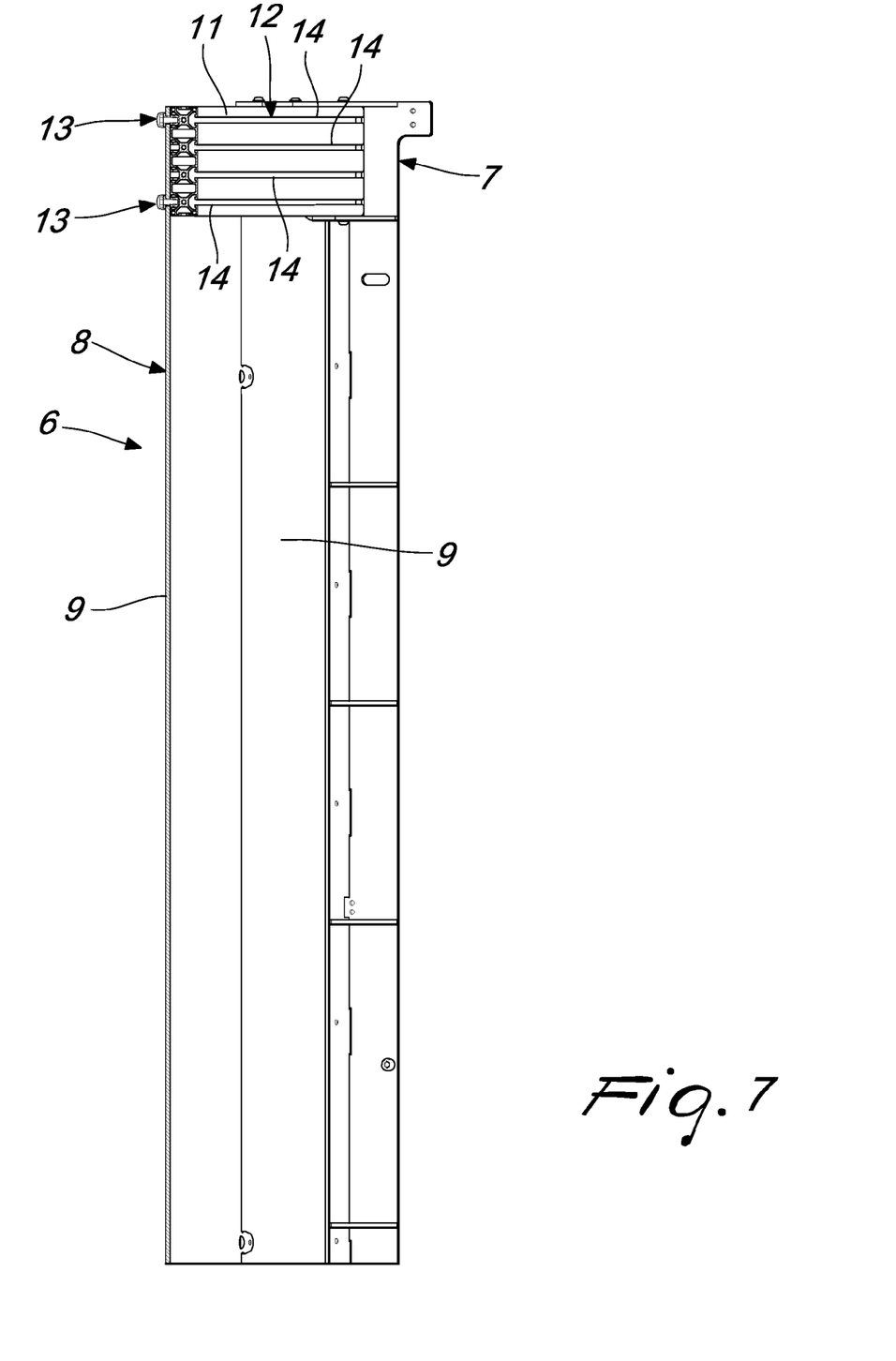
FIG. 7 is a sectional view, taken along a vertical plane, of the protection structure.

Furthermore, the machine is provided with at least one protection structure 6, which is movable, with respect to the base structure 2, in order to pass from an active condition, shown for example in FIG. 1, in which it prevents access from the outside to at least one portion of the conveyance carousel 3, to an inactive condition, shown for example in FIG. 2, in which it allows access from the outside to the conveyance carousel 3, so as to allow the intervention of the user on the conveyance carousel 3 or the coupling to the base structure 2, in the desired angular position around the conveyance carousel 3, of one or more labeling assemblies, designed to apply labels on the containers that pass on the conveyance carousel 3 and are not shown for sake of simplicity, and vice versa.

According to the invention, the protection structure 6 comprises a supporting framework 7 for components 8 of the protection structure 6, constituted in particular by at least one closure panel 9, which, with the protection structure 6 in the active condition, is capable of delimiting laterally at least one portion of the conveyance carousel 3, so as to prevent access thereto from outside, and/or by at least one grip handle 10, which allows the user to maneuver the protection structure 6 in order to move it between the active condition and the inactive condition.

Again according to the invention, the supporting framework 7 comprises a profiled bar 11 having an arc-like extension around the axis of the conveyance carousel 3, which is arranged above the base structure 2 and forms at least one engagement seat 12 for means 13 for fixing at least one of the components 8 of the protection structure 6 to the supporting framework 7.

Advantageously, said engagement seat 12 is constituted by one or more longitudinal slots 14, which extend along the extension of the profiled bar 11 and allow the engagement, along their longitudinal extension, of the fixing means 13.

With this structure it is possible to connect the closure panels 9 and/or the grip handles 10 that compose the protection structure 6 by fixing them to a single profiled bar 11, which by virtue of the presence of multiple longitudinal slots 14 for the engagement of the fixing means 13, in addition to offering a valid element for anchoring the components 8 of the protection structure 6 to the supporting framework 7, with a consequent structural simplification of the protection structure 6, offers the possibility to fix the components 8 freely in any position along the profiled bar 11.

In particular, on the profiled bar 11 there are one or more longitudinal slots 14 which are open at least on the face of the profiled bar 11 directed outward with respect to the axis of the conveyance carousel 3. It is also possible to provide on the profiled bar 11 one or more longitudinal slots 14 which are open on the inner side, i.e., the one directed toward the conveyance carousel 3, as well as on its sides directed downward and upward.

More particularly, at least the longitudinal slots 14 arranged on the external face of the profiled bar 11, as well as those optionally arranged on its external face, are arranged mutually parallel and spaced along a substantially vertical direction.

With reference to the embodiment shown, the profiled bar 11 has, in transverse cross-section, a plurality of central portions 11a, with a cross-section that has a substantially polygonal shape, for example square or rectangular, axially hollow and mutually superimposed, from which wings 11b extend diagonally in the various directions and are connected, by means of vertical joining portions 11c, to the wings 11b of the adjacent central bodies 11a and delimit the longitudinal slots 14 with pairs of opposite wings 11d that extend from the end portions of the vertical joining portions 11c.

Conveniently, the fixing means 13 comprise at least one connection screw 15 which engages the corresponding component 8 and engages, with at least one portion of its stem 15a, a corresponding longitudinal slot 14.

If the component 8 is, for example, constituted by a closure panel 9, the fixing means 13 may advantageously comprise multiple connection screws 15 which may engage in the same longitudinal slot 14 and/or in different longitudinal slots 14 of the profiled bar 11.

Figure 8:
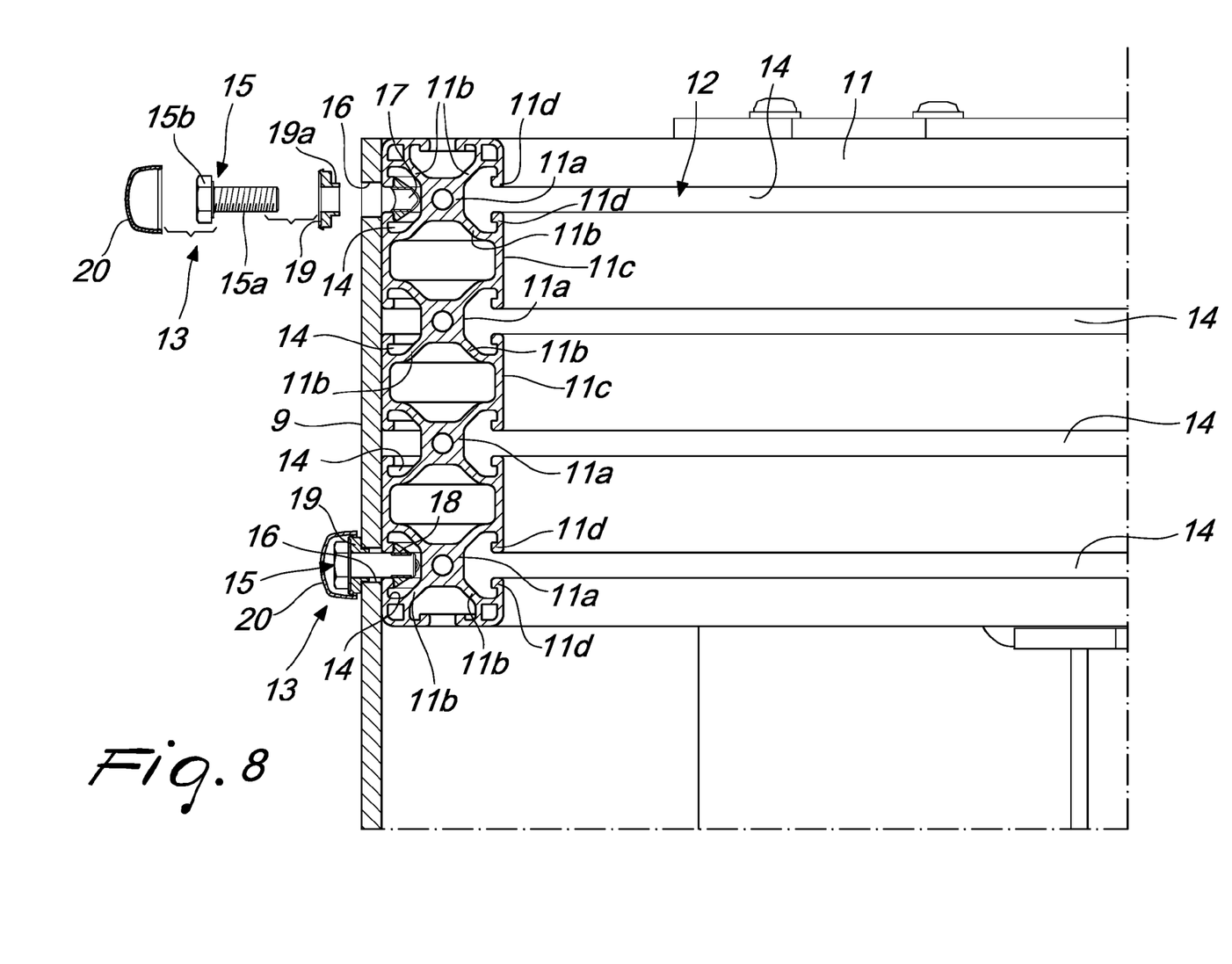
FIG. 8 is an enlarged detail of FIG. 7.
Figures 9, 10, 11:
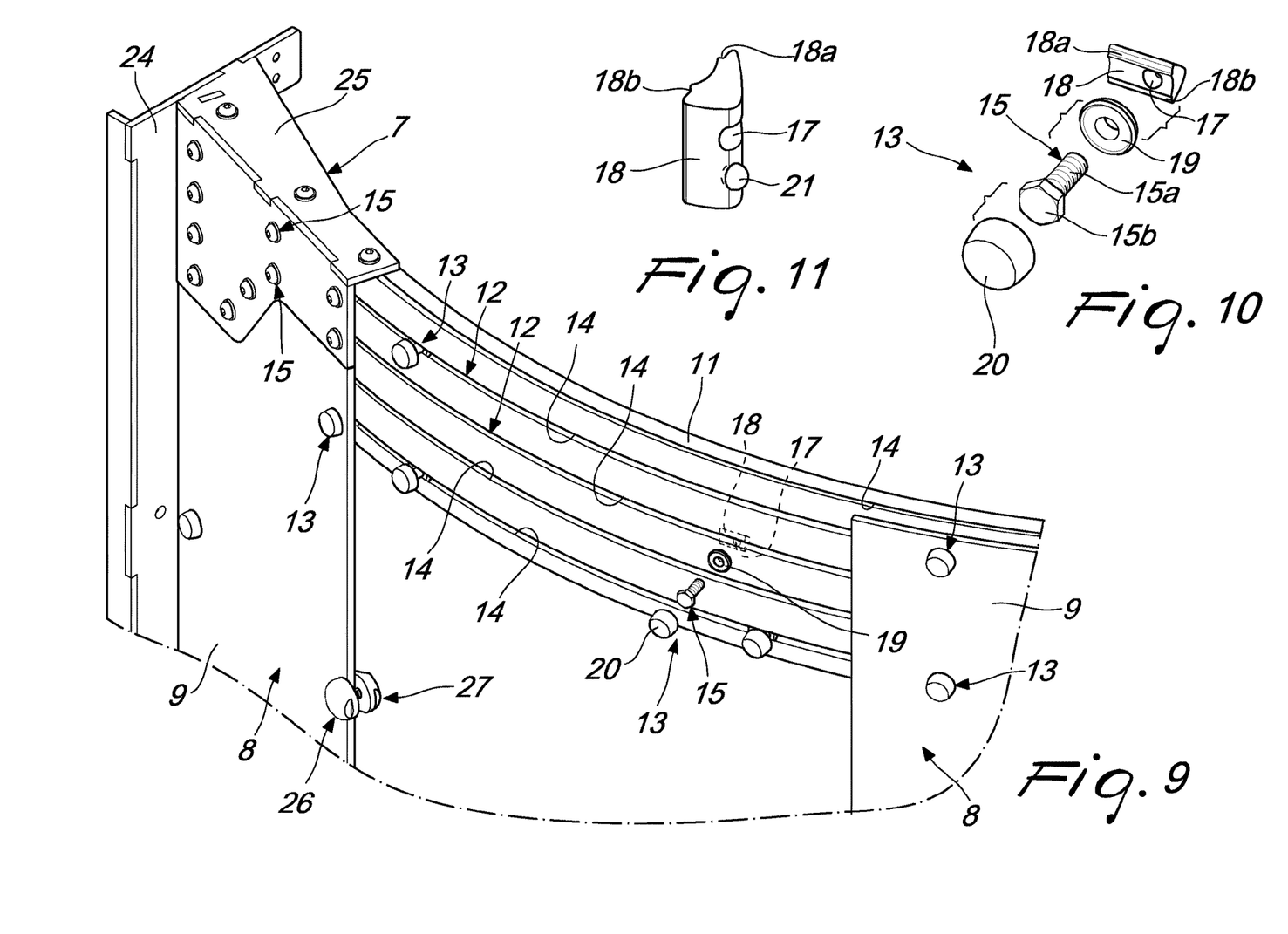
FIG. 9 is a partially exploded perspective view of a portion of the protection structure.
FIG. 10 is an exploded perspective view of means for fixing components of the protection structure.
FIG. 11 is a perspective view of an insert belonging to the means for fixing components of the protection structure.

In particular, as highlighted in particular in FIG. 8, the connection screws 15 pass through respective holes 16 formed in the closure panel 9, abutting, with their head 15b, against the external face of the closure panel 9 and being inserted with their stem 15a in the corresponding longitudinal slot 14, passing through the access opening of the longitudinal slots 14 located on the external face of the profiled bar 11.

Advantageously, each connection screw 15 is screwed in a respective female thread 17 defined in a corresponding insert 18 that is accommodated in the corresponding longitudinal slot 14.

Each insert 18 has, conveniently, a shape in transverse cross-section that is substantially complementary to that of the longitudinal slots 14, with, for example, a substantially cradle-like shape formed on the side directed toward the head 15b of the corresponding connection screw 15, and is provided, laterally to the female thread 17 and on mutually opposite sides, with a pair of retention portions 18a, 18b, which are designed to engage against the opposite wings 11d of the corresponding longitudinal slot, i.e., against the edge regions, directed toward the inside of the access opening of the corresponding longitudinal slot 14.

Conveniently, a washer 19 is interposed between the head 15b of each one of the connection screws 15 and the corresponding closure panel 9 and is capable of engaging, with an axial portion 19a, the hole 16 that is formed in the closure panel 9 and is crossed by the corresponding connection screw 15. A respective lid 20 can be coupled to each washer 19 in order to protect the head 15b of the corresponding connection screw 15.

Advantageously, each insert 18 can be provided with detachable locking means along the corresponding longitudinal slot 14, which can, for example, comprise an engagement element 21, conveniently with a substantially spherical shape, which protrudes from the insert 18 and is elastically pushed by a spring inserted in the body of the insert 18, in order to be able to engage the bottom of the longitudinal slot 14, so as to maintain the retention portions 18a, 18b of the insert 18 rested against the opposite wings 11d of the profiled bar 11.

Conveniently, the profiled bar 11 is supported, at its ends, by a pair of uprights 22 and in particular it is capable of sliding, along the extension of the uprights 22, in order to allow the passage of the protection structure 6 from the active condition to the inactive condition and vice versa.

As shown, the uprights 22 extend upward from the base structure 2 and support a respective linear guide 23, to which a respective upright element 24 of the supporting framework 7 is coupled so that it can slide. At their upper end, the upright elements 24 are connected to respective brackets 25 which are fixed to the ends of the profiled bar 11 by means of connection screws 15 which engage the longitudinal slots 14 of the profiled bar 11.

The closure panels 9 located proximate to the ends of the profiled bar 11 are conveniently connected also to the upright elements 24 for example by means of screws, rivets or the like.

It should be noted that the closure panels 9 may be made of transparent plastic material, such as polycarbonate or the like, or of glass or of other material considered suitable.

Figure 12:
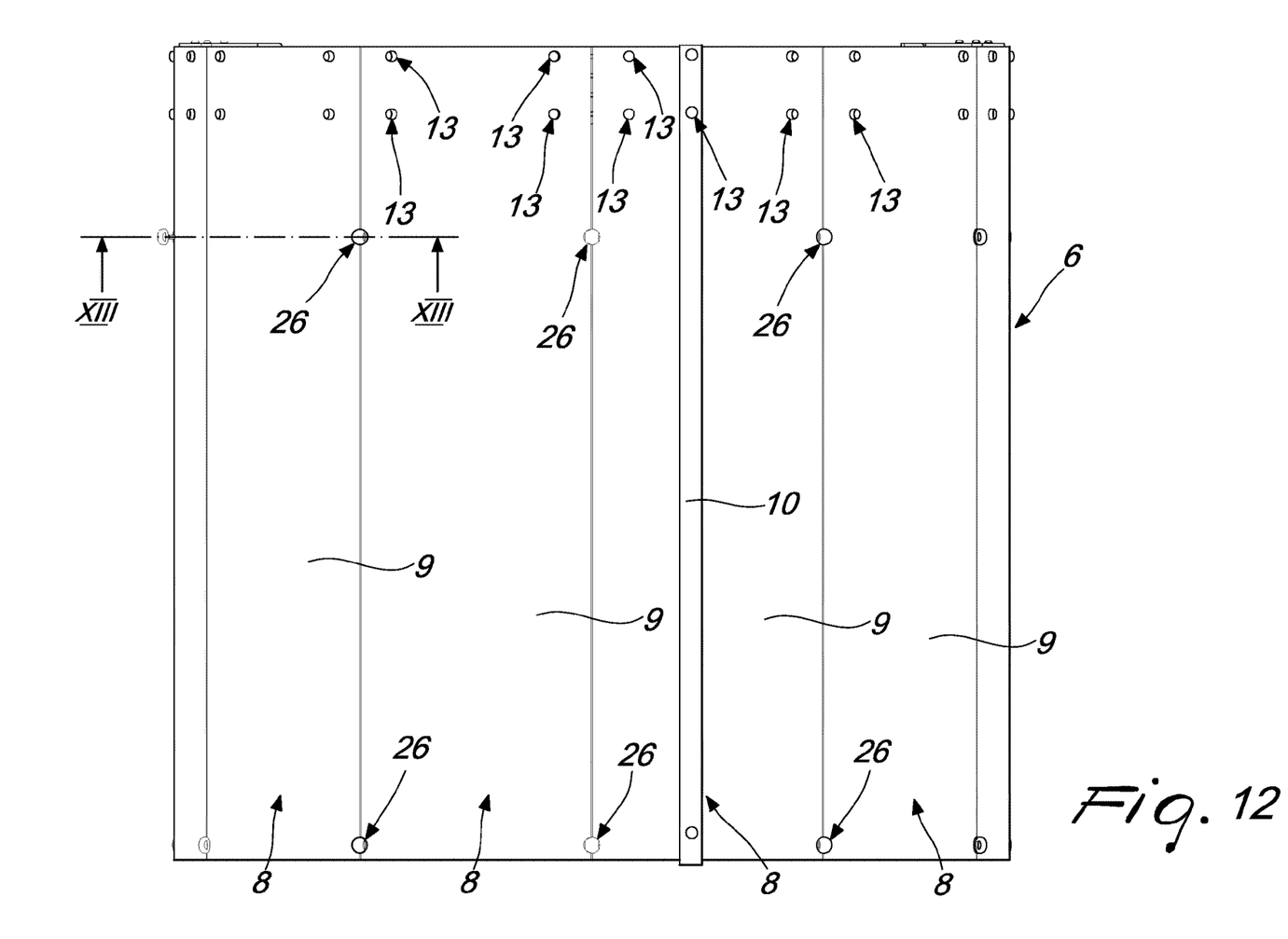
FIG. 12 is a front elevation view of the protection structure.
Figure 13:
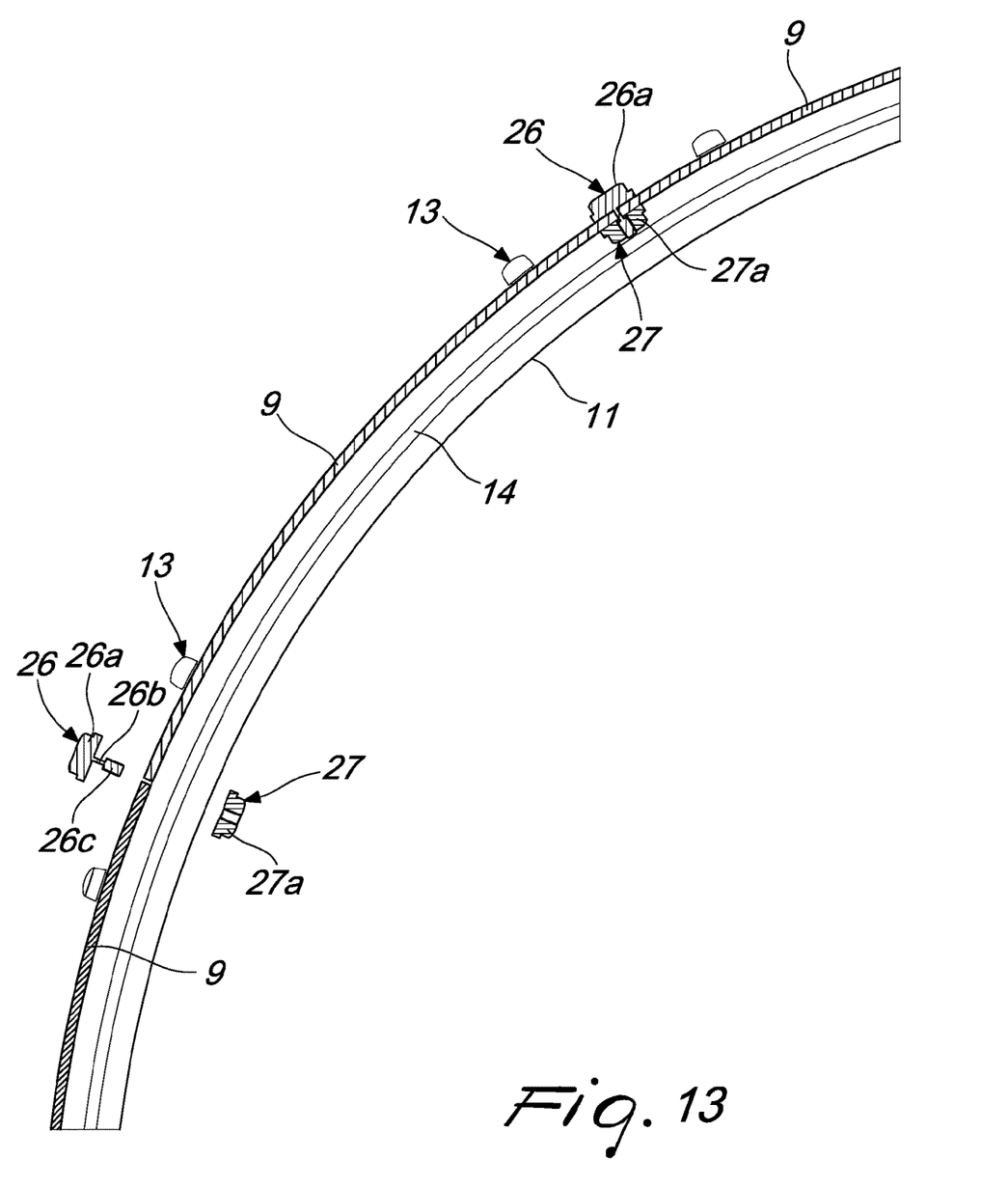
FIG. 13 is a sectional view, taken along the plane XIII-XIII of FIG. 12.

For the sake of completeness, it should also be added that it is possible to provide means for mutual joining of the closure panels 9 arranged mutually adjacent. As can be seen in particular in FIG. 12, said mutual joining means are constituted for example by a first joining member 26 and by a second joining member 27 which can be mutually coupled and act on opposite faces of the closure panels 9. In particular, the first joining member 26 is provided with an abutment head 26a designed to rest against a first face of two mutually adjacent closure panels 9 and with a stem 26b, which extends from the abutment head 26a and is designed to cross the space between the two adjacent closure panels 9, while the second joining member 27 comprises a locking nut 27a designed to rest against a second face of the two closure panels 9, which is opposite with respect to the first face, and can be engaged with a threaded portion 26c of the first joining member 26, arranged at the end of the stem 26b that is opposite the one connected to the abutment head 26a.

Conveniently, the upright elements 24 are connected at their upper end, by means of a flexible connection member 28, such as for example a belt, a cable or others, to a respective counterweight, which can slide inside the corresponding upright 22 and is not visible in the figures, in order to facilitate the manual movement of the protection structure 6.

Conveniently, the protection structure 6 may be provided with one or more grip handles 10, which are conveniently provided by means of a respective metallic profile, arranged substantially vertically and provided with a substantially T-shaped transverse cross-section so as to define a grip portion, and are fixed, at least at their upper end, to the profiled bar 11 by means of respective connection screws 15.

It should also be noted that on the side of the base structure 2 that is opposite with respect to the one affected by the presence of the protection structure 6 there are advantageously openable doors 29 for direct access to the region of the input conveyor 4 and of the output conveyor 5.

Such doors 29 are conveniently hinged to a perimetric frame 30 connected by means of crossmembers 31 to the uprights 22.

The use of the machine according to the invention is easy to understand from what has been described above.

In practice, the user, wanting to make the region of the base structure 2 affected by the conveyance carousel 3 accessible from the outside, will make the profiled bar 11 slide upward, along the linear guides 23, by grabbing a grip handle 10 fixed to the profiled bar 11, so as to obtain the passage of the protection structure 6 from the active condition to the inactive condition, with a consequent rise with respect to the base structure 2 of the closure panels 9 of said protection structure 9.

If instead the user wants to prevent access from the outside to the conveyance carousel 3, it is sufficient for him to grip the grip handle 10 and make the profiled bar 11 slide downward along the linear guides 21, until the protection structure 9 is brought to the active condition.

In practice it has been found that the invention achieves the intended aim and objects by providing a labeling machine that has a protection structure of the conveyance carousel of the containers that is extremely practical and easy to provide.

The invention thus conceived is susceptible of numerous modifications and variations, all of which are within the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102018000005843 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A labeling machine, comprising: a base structure which rotatably supports a conveyance carousel for containers to be labeled and at least one protection structure which can move, with respect to said base structure, from an active condition, in which it prevents access from the outside to at least one portion of said conveyance carousel, to an inactive condition, in which it allows access from the outside to said at least one portion of said conveyance carousel, and vice versa, wherein said protection structure comprises a supporting framework for components of said protection structure, said supporting framework comprising a profiled bar having an arc-like extension around an axis of said conveyance carousel, which is arranged above said base structure and forms at least one engagement seat for means for fixing to said supporting framework at least one of said components;

wherein said at least one engagement seat comprises at least one longitudinal slot which extends along the extension of said profiled bar and is open at least on a face of said profiled bar that is directed outward with respect to the axis of said conveyance carousel;

wherein said profiled bar is provided with a plurality of longitudinal slots for engagement of said fixing means, the longitudinal slots arranged so as to be mutually parallel and spaced along a substantially vertical direction;

wherein said fixing means comprise at least one connection screw which engages said at least one of said components of the protection structure, wherein the at least one connection screw includes a stem and at least one portion of the stem engages said at least one longitudinal slot;

wherein said at least one connection screw is screwed into a respective female thread that is formed in a corresponding insert accommodated in said at least one longitudinal slot.

2. The machine according to claim 1, wherein said components of said protection structure comprise at least one closure panel.

3. The machine according to claim 1, wherein said components of said protection structure comprise at least one grip handle in order to allow a user to move said protection structure between said active condition and said inactive condition.

4. The machine according to claim 1, wherein said profiled bar is supported, at ends thereof, by a pair of uprights so that said profiled bar can slide along an extension of said uprights.

* * * * *